E. T. Briggs,
Curtain Fixture.
No. 2,026, Reissued July 11, 1865.
Fig; 1.
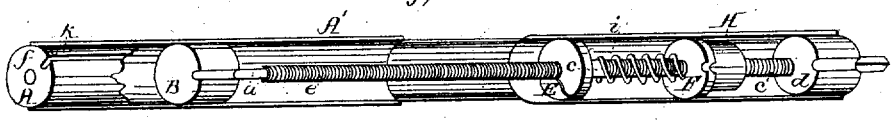
Fig; 2.
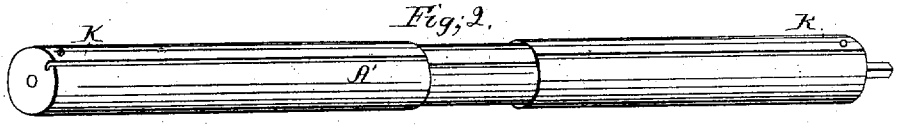
Fig; 3.
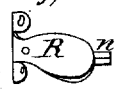
Fig; 4.
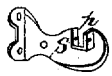
Fig; 5.
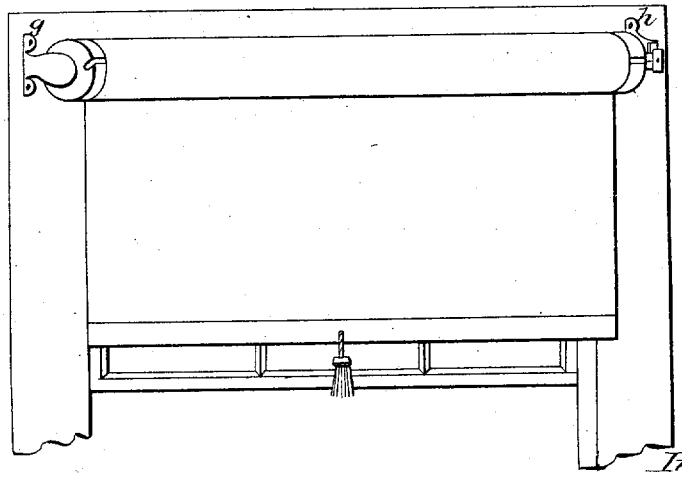
Witnesses;
Frederick Curtis
J. B. Terry
Inventor;
Edward T. Briggs
by his attorney.
R. H. Eddy
N. PETERS, PHOTO-LITHOGRAPHER, WASHINGTON, D. C.

UNITED STATES PATENT OFFICE.

EDWARD T. BRIGGS, OF BOSTON, MASSACHUSETTS.

CURTAIN-FIXTURE.

Specification forming part of Letters Patent No. 38,555, dated May 19, 1863; Reissue No. 2,026, dated July 11, 1865.

*To all whom it may concern:*

Be it known that I, EDWARD T. BRIGGS, late of Salem, in the county of Essex, but now of Boston, in the county of Suffolk and State of Massachusetts, have invented a new and useful or Improved Window-Shade or Curtain-Fixture; and I do hereby declare that the following is a full, clear, and exact description of the same, reference being had to the accompanying drawings, making a part of this specification, in which—

Figure 1 is a perspective view of a tubular roller with a portion of its shell exhibited as broken away in order to show the mechanism within the roller. Fig. 2 is a perspective view of a roller ready to receive the shade or curtain. Figs. 3 and 4 are perspective views of the brackets used for hanging the shade. Fig. 5 is a perspective view of a shade-fixture and shade or curtain as they appear when in working order.

This invention consists in a peculiar arrangement and construction of parts, forming a simple, cheap, and reliable shade-fixture, as will be hereinafter explained.

To enable others skilled in the art to which my invention appertains to fully understand and use the same, I will proceed to describe its construction and operation.

A′ represents a metallic tube or roller having fitted to and secured within it at its ends short cylindrical plugs A D, which revolve with the rollers or are stationary relatively thereto. B is a similar plug or block, fitted in the roller and near the plug A, and secured against lateral movement by one or more screws or pins passing through the metallic shell and into such plug B. The plug D has a hole made axially through it, in which a cylindrical shaft, *a*, near one of its ends is loosely fitted, the said shaft being supported at its opposite end in a cavity or bearing formed in the block B. The shaft *a* has a screw-thread cut on a portion of it, and its outer end, or that part of the shaft which extends beyond the plug D, is made square or polygonal in transverse section to fit a corresponding hole or recess, *p*, formed in the bracket S, which supports that end of the roller.

E H are nuts adapted to the screw-thread *c* of the shaft *a*. F is a disk concentric with and fitted to slide loosely on the screw *c*, and to have endwise movement within the hollow roller A′.

*e* is a helical spring slipped on the non-screw-threaded part of the shaft *a*, and attached at one of its ends to the shaft *a* and at the other to one side of the nut E. On the opposite side of the nut E, and interposed between it and the loose disk F on the same shaft, is a spiral spring, *i*, which, as the nut E is advanced on the screw by the rotation of the roller while the curtain is in the act of being drawn downward, and simultaneously draws out and coils the helical spring, becomes contracted, and so as to press the disk F against the nut or block H. The effect of this crowding of the loose disk F against the nut H will be to create friction either to partially or wholly counteract the increased tension of the helical spring *e*, and thus prevented from recoiling and winding up the shade. The nut E is to be so connected with and applied to the roller A′ as to be revolved with and by it and still be capable of moving endwise on the screw *c*. For connecting the plugs B D, the nut E, and the disk F to the roller A′, so that each of them shall be caused to revolve with and by such roller, I form a notch in the circumference of each of the said parts B D E F and provide the roller with a "feather" or rib to extend from and along its inner surface and to enter the notches of the said parts.

The shade may be attached to the roller by hemming the top edge of such shade over a fine cord, and next drawing it and the cord through the groove *k*, formed lengthwise in the roller. The different parts in the roller being properly adjusted and the shade attached, as before explained, the plug A, which has a small central cavity, *f*, made in it, should be placed upon the teat *n* of the bracket R, the squared end of the shaft at the opposite end of the roller being next inserted in the square recess or mortise *p* in the bracket S, the brackets having been previously fastened to the window-frame by screws.

In order to cause the shade to be raised it will only be necessary to lift the tassel, which is attached to the bottom part thereof, in which case the recoil of the helical spring will rotate the roller, and thereby cause the shade to be wound thereon. By relinquishing the hold upon the tassel its weight and that of the pendent part of the shade, together with the friction created between the loose disk and nut, will be sufficient to counteract the tendency of the helical spring to revolve the roller so as to wind up the shade. Thus we may retain the lower edge of the shade at any desirable altitude within the limits of its movements.

If desirable, the tassel may be weighted or have a weight placed within it.

I would further remark that the nut E and the screw *c*, combined with the shaft *a*, the roller A′, and its spring *e*, answer, irrespective of the remainder of the friction apparatus, an excellent purpose—that is, they prevent the spring *e* from unwinding farther than is necessary to cause the roller to wind up the shade, and they also prevent the roller from being turned backward so as to injure the spring. These results follow from the fact that as soon as the nut may reach that end of the screw which is next to the spring *e*, such nut will be stopped from being farther revolved in the same direction on the screw, it being understood that the external diameter of the screw is no greater than the diameter of the shaft *a*.

Having thus described my invention, what I claim as new, and desire to secure by Letters Patent, is as follows:

1. The combination composed of the tubular curtain-roller A′, its stationary shaft *a*, and helical spring *e*, as set forth, and a friction apparatus, substantially as described, or its equivalent for the purpose, or to operate as set forth, the whole being for application to a shade, and a weighted tassel, and co-operative, as explained.

2. The combination of the nut E and the screw *c* with the shaft *a*, the roller A′, and its spring *e*, they being arranged and applied as described, and the purpose of such screw and nut, irrespective of their use with the remainder of the friction apparatus, being to prevent the spring from unwinding farther than is necessary to cause the roller to wind up the shade.

3. The friction apparatus constructed or composed of the screw *c*, the disk F, the nut E, the spring *i*, and the nut H, and arranged with the roller A and its shaft *a* so as to operate therewith, substantially as set forth.

EDWARD T. BRIGGS.

Witnesses:

R. H. EDDY,

F. P. HALE, Jr.